(12) United States Patent
Tao

(10) Patent No.: US 6,192,139 B1
(45) Date of Patent: Feb. 20, 2001

(54) HIGH REDUNDANCY SYSTEM AND METHOD FOR WATERMARKING DIGITAL IMAGE AND VIDEO DATA

(75) Inventor: Bo Tao, Sunnyvale, CA (US)

(73) Assignees: Sony Corporation of Japan, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/309,740

(22) Filed: May 11, 1999

(51) Int. Cl.[7] .............................. G06K 9/00; G06K 9/36; G09C 3/00
(52) U.S. Cl. .............................. 382/100; 382/232; 380/54
(58) Field of Search .................................. 382/232, 100, 382/115, 212, 218; 380/54, 44, 29, 215, 261; 713/183

(56) References Cited

U.S. PATENT DOCUMENTS

| | | | |
|---|---|---|---|
| 4,447,672 | * 5/1984 | Nakamura | 178/22.19 |
| 5,008,935 | * 4/1991 | Roberts | 380/29 |
| 5,721,788 | 2/1998 | Powell et al. | 382/100 |
| 5,809,160 | 9/1998 | Powell et al. | 382/100 |
| 5,875,249 | * 2/1999 | Mintzer et al. | 380/54 |
| 5,915,027 | * 6/1999 | Cox et al. | 380/54 |

OTHER PUBLICATIONS

"Video–Steganography: How to Secretly Embed a Signature in a Picture," KineoMatsui and Kiyoshi Tanaka, Technological Strategies for Protecting Intellectual Property in the Networked Multimedia Environment, vol. 1, issue 1, Jan., 1994.*

Tao et al., "Adaptive Watermarking in the DCT Domain," Apr. 1997, Departmnet of Electrical Engineering, Princeton University, Princeton, NJ.

Cox et al., "Secure Spread Spectrum Watermarking for Multimedia," NEC Research Institute, Princeton, NJ.

Swanson et al., "Data Hiding for Video–in–Video," 1997, Department of Electrical and Computer Engineering, University of Minnesota, Minneapolis, MN.

* cited by examiner

Primary Examiner—Thomas D. Lee
Assistant Examiner—Wenpeng Chen
(74) Attorney, Agent, or Firm—Wagner, Murabito & Hao LLP

(57) ABSTRACT

A method and system thereof for encoding watermark information such as copyright information within digital data representing, for example, still and video images. A sequence of bits representing the watermark information is mapped into a first plurality of groups such that the first plurality of groups includes more bits than the sequence of bits. The bits from each group of the first plurality of groups are interleaved to form a second plurality of groups. The bits from the second plurality of groups are serialized to form an encoded sequence of bits. Coefficients representing the digital data are modified according to the encoded sequence of bits. In one embodiment, a coefficient is made into an even number when the bit has a first value and the coefficient is made into an odd number when the bit has a second value. In one embodiment, the digital data are in a compressed format (e.g., JPEG or MPEG). The digital data can be subsequently read to retrieve the encoded sequence, and the encoded sequence is then decoded and compared to the original watermark information.

25 Claims, 9 Drawing Sheets

HIGH REDUNDANCY SYSTEM AND METHOD FOR WATERMARKING DIGITAL IMAGE AND VIDEO DATA

BACKGROUND OF THE INVENTION

1. Field of the Invention

The present invention relates to the field of recorded digital media. More specifically, the present invention pertains to a system and method for encoding, embedding, retrieving and decoding copy protection information within digital data.

2. Background Art

The use of digital media is proliferating due to the rapid development and increasing popularity of digital equipment such as digital videocassette recorders (VCRs), digital camcorders, digital still cameras and the like. The proliferation of digital media has also created a need for methods for enforcing copyrights and protecting copyright ownership of digital still images (including text) and video. For instance, the Copyright Protection Technique Group (CPTG) was formed as an industry consortium and is addressing copyright protection for digital video (or versatile) devices (DVDs).

One prior art method for protecting copyrights is to encrypt the copyrighted digital data. Only a valid keyholder is provided with a key for deciphering the encrypted data. However, once such data are decrypted, cryptographic techniques provide no method for controlling subsequent reproduction or retransmission. Thus, these techniques provide no protection against unauthorized reproduction of digital information.

To address the shortcomings associated with cryptographic techniques, copy protection information (e.g., a digital watermark) can be used to permanently embed an identification code into the digital data. The existence of visual redundancy in still images and video makes it possible to alter the digital image and video data in order to embed watermark information. The embedded watermark information serves as, the proof of copyright ownership. The watermark is intended to remain present within the data even after a decryption process is applied.

The watermark may be either invisible or visible; in the former case, it is desirable that the watermark be undetectable by the human visual system. It is also desirable that the watermark be robust; that is, the watermark should be difficult if not virtually impossible to remove or destroy, and attempts to remove or alter the watermark should also reduce the fidelity of the copyrighted data. In addition, it is desirable that the watermark unambiguously identify the proper owner of the copyrighted information.

In some prior art watermarking schemes, a pseudo-random sequence representing the watermark is inserted into the digital data; however, these schemes introduce a number of difficulties. First, the sequence must be large enough so that it will be unique, but this causes problems with detecting the watermark. For example, the detection metrics have to be computed for each of the watermark sequences issued for use in order to determine a statistically satisfactory match between any sequence detected in the data and a valid watermark. However, for a reasonably large sequence, this computation can take a very long time to complete.

Second, in order for the watermark to be robust against attempts to remove or destroy it by the introduction of noise, it must be different enough from other valid watermarks. Accordingly, the distance between each new watermark data and previously issued watermark data must be checked to make sure that the watermarks are not too close to each other. If they are too close, a new watermark must be generated and tested again. Again, these computations can take a very long time to complete. The random sequence techniques are also problematic if the watermark is limited in size in order to keep computation times to a reasonable length, because the robustness of the watermark is thereby reduced.

Another common prior art watermarking technique is to repeat the same watermark sequence at several different locations in the digital data. However, the resulting watermark is not robust against noise introduced to remove or destroy the watermark. For example, the watermark may be removed from some locations and remain in others, thus creating a degree of uncertainty regarding whether or not the watermark information was deliberately tampered with.

Another significant disadvantage to the watermark techniques described above and in other prior art watermark techniques is that knowledge of the original digital data (e.g., the original image) and of the original watermark is required in order to allow a comparison with the data in hand so that the watermark can be detected and decoded. Thus, for example, it is necessary to provide the digital equipment (e.g., VCRs, camcorders, and cameras) with the capability to store both the original set of digital data as well as the copy of the data in question and to compare the two sets of data; otherwise, additional equipment is necessary. In either case, the complexity of the equipment required and the associated cost are increased.

In addition, the prior art is problematic if digital data for either the original image or the copy is not available; for example, if only a print or film image is available. In this case, it is necessary to first scan the image for which the data are missing in order to have a digital representation of both the original and the copy so that a comparison can be performed to verify copyright authenticity. In addition to being a cumbersome approach, the scanning process requires additional equipment (and hence further increases costs), and also introduces uncertainties into the data that may in fact preclude detection of a valid watermark. Thus, in order to create a watermark that will remain detectable despite these uncertainties, it is necessary to significantly alter the digital data. For example, the pixel value of the data at each of the particular locations (e.g., a pixel) where the watermark is being embedded needs to be increased or decreased by a significant percentage so that the watermark will stand out even with the uncertainties introduced by scanning. Consequently, surrounding pixels may also need to be changed so that the image is properly blended. This in turn limits the number and position of possible locations within the digital data which can be altered without being detectable by the human visual system or without compromising the accuracy of the stored digital image.

In summary, prior art techniques for embedding watermarks into digital data representing still images and video suffer from a number of disadvantages. The watermarks generated using the prior art techniques are not robust against noise and are difficult to encode, detect and decode. The prior art techniques require knowledge of the digital data for the original image, and require complex and costly equipment for comparing the copy at hand with the original (and for scanning images when either the original or the copy are not available in digital form). The watermarks generated using prior art techniques can require significant alteration of the digital image data, and so the number and position of possible locations within the digital data for placing the watermark are limited.

SUMMARY OF THE INVENTION

Accordingly, what is needed is a method and system for embedding watermark information into digital data that generate a watermark that is robust against noise and that is easy to encode, detect and decode. What is also needed is a system or method that satisfy the above needs and also do not require knowledge of the original image. In addition, what is needed is a system and method that satisfy the above needs and generate watermarks that can be embedded into the digital data without significantly altering the data, and thereby permit the watermark to occupy a large number of positions.

The present invention includes a method and system thereof that satisfy the above needs. These and other advantages of the present invention not specifically mentioned above will become clear within discussions of the present invention presented herein.

The present invention pertains to a method and system thereof for encoding watermark information such as copyright information within digital data representing, for example, still and video images. A sequence of bits representing the watermark information is mapped into a first plurality of groups such that the first plurality of groups includes more bits than the sequence of bits. The bits from each group of the first plurality of groups are interleaved to form a second plurality of groups. The bits from the second plurality of groups are serialized to form an encoded sequence of bits. Coefficients representing the digital data are modified according to the encoded sequence of bits. In one embodiment, a coefficient is made into an even number when the bit has a first value and the coefficient is made into an odd number when the bit has a second value.

In one embodiment, the digital data are in a compressed format (e.g., JPEG or MPEG).

In one embodiment, the sequence of bits representing the watermark information are mapped into the first plurality of groups using an error-correcting cyclic code such as a BCH (Bose, Chaudhuri, and Hocquenghem) code.

The digital data can be subsequently read to retrieve the encoded sequence, and the encoded sequence is then decoded. In one embodiment, the encoded sequence is deserialized to form a plurality of groups of interleaved bits. The interleaved bits are separated to form a third plurality of bits which is mapped into a decoded sequence of bits containing fewer bits than the third plurality of groups. The decoded sequence is then compared to the original watermark information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 illustrates an exemplary image frame containing digital data in accordance with the present invention.

DETAILED DESCRIPTION OF THE INVENTION

Figure 1:
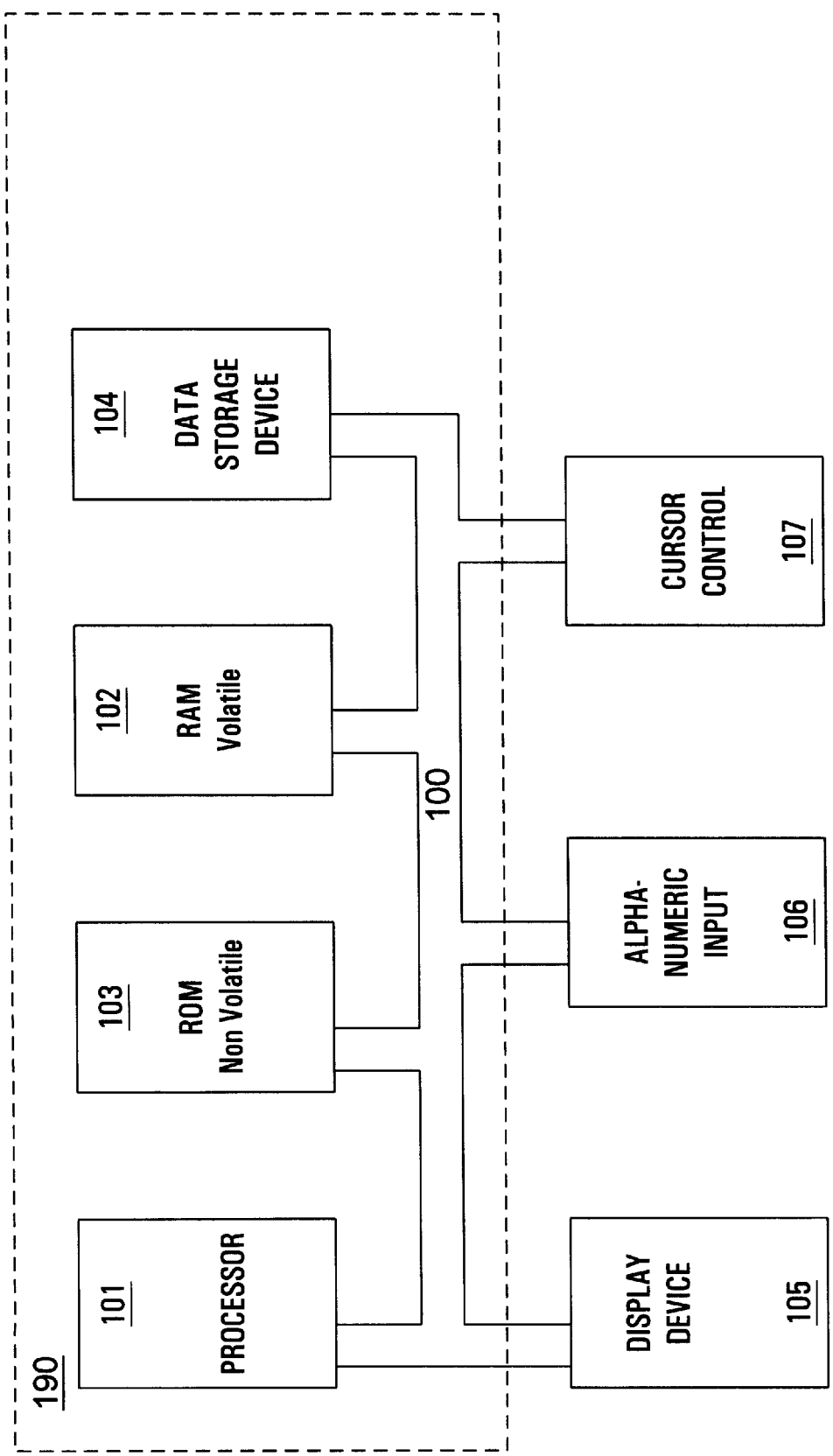
FIG. 1 is a block diagram of an exemplary computer system upon which embodiments of the present invention may be practiced.

In the following detailed description of the present invention, high redundancy system and method for watermarking digital image and video data, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "mapping" or "interleaving" or "serializing" or "modifying" or "separating" or "grouping" or the like, refer to the action and processes of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

The present invention pertains to a method and system thereof for encoding watermark information such as copyright information within digital data representing, for example, still images (including text) and video images. Particular locations within the digital data are modified in accordance with the present invention in order to embed the encoded watermark in the digital data. The digital data at each particular location can be subsequently read to retrieve the encoded watermark, and the encoded watermark is then decoded.

In the discussion herein, the present invention is described primarily in the context of a still image in the compressed data domain. However, it is understood that the present invention may be utilized with digital video data and may be utilized in the uncompressed data domain.

Refer now to FIG. 1 which illustrates an exemplary computer system 190 upon which embodiments of the present invention may be practiced. In general, computer system 190 comprises bus 100 for communicating information, processor 101 coupled with bus 100 for processing information and instructions, random access memory 102 coupled with bus 100 for storing information and instructions for processor 101, read-only memory 103 coupled with bus 100 for storing static information and instructions for processor 101, data storage device 104 such as a magnetic or optical disk and disk drive coupled with bus 100 for storing information and instructions, a user output device such as display device 105 coupled to bus 100 for displaying information to the computer user, a user input device such as alphanumeric input device 106 including alphanumeric and function keys coupled to bus 100 for communicating information and command selections to processor 101, and a user input device such as cursor control device 107 coupled to bus 100 for communicating user input information and command selections to processor 101.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2A:
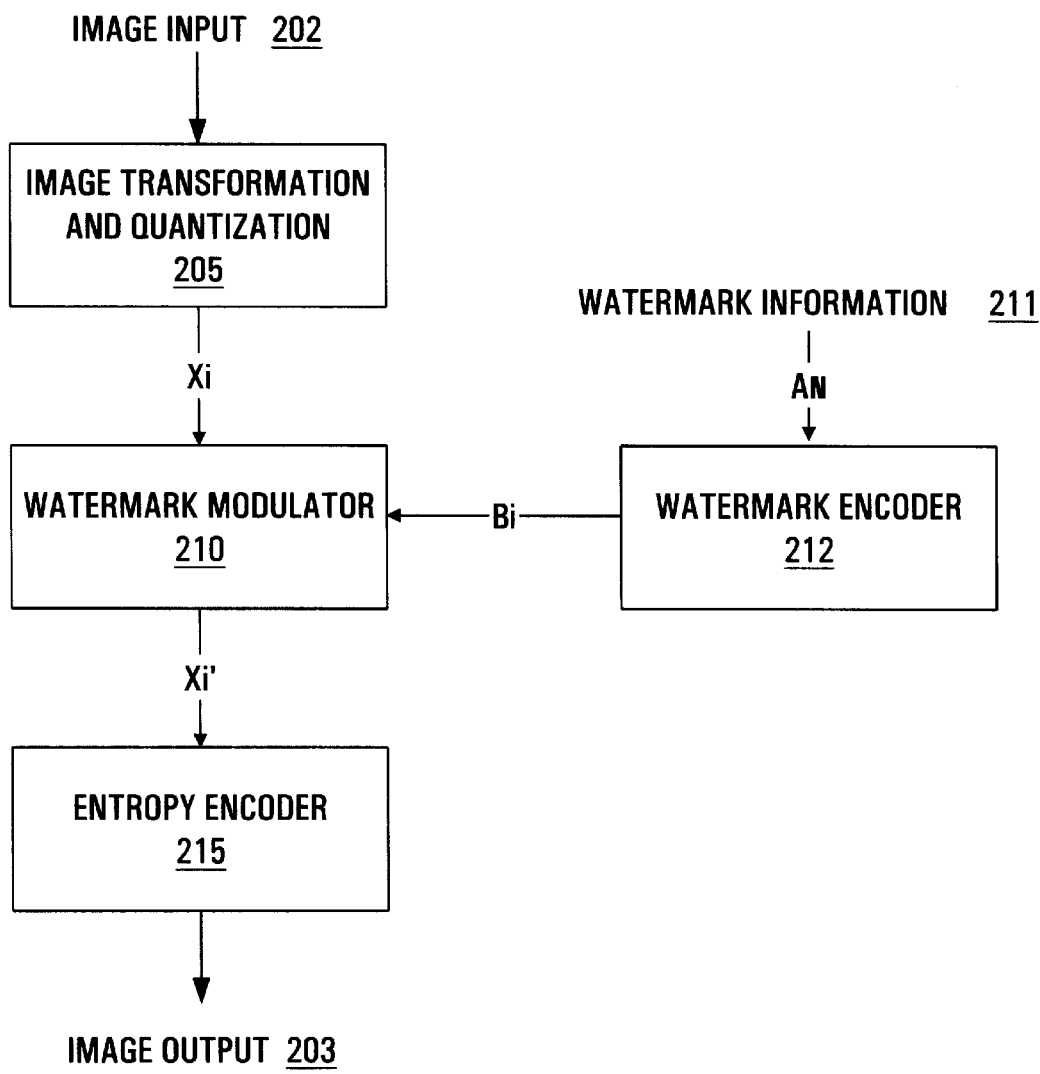
FIG. 2A is a data flow diagram of one implementation of a watermark encoder in accordance with the present invention.

With reference now to FIG. 2A, data flow diagram 200 illustrates the flow of digital image data (e.g., still images including text or video images) and watermark data through a watermark encoder implemented using computer system 190 (FIG. 1) in accordance with one embodiment of the present invention. In this embodiment, the watermark information is embedded into the image data at the same time that the image data are compressed using the JPEG (Joint Photographic Experts Group) format. It is appreciated that the present invention may be utilized with other compression formats such as MPEG (Moving Picture Experts Group). In addition, the present invention may be used with data that are already compressed (see discussion pertaining to FIG. 2B).

Continuing with reference to FIG. 2A, image input 202 (e.g., digital image data) is read or received, for example, from a memory unit or data storage device of computer system 190, or from a broadcast signal. It is appreciated that image input 202 can be loaded from various types of digital equipment such as videocassette recorders, camcorders, and cameras using a cable link, an optical or magnetic disk, or other mechanisms. In this embodiment, image input 202 is not yet encoded in the JPEG format.

Image transformation and quantization element 205 receives the digital image input 202 and performs transformation and quantization operations to compress the digital image data using, for example, the known JPEG process. In one embodiment, discrete cosine transformation is used. The output of Image transformation and quantization element 205 is a plurality of digital DCT (discrete cosine transform) coefficients X that represent image input 202 as encoded in the JPEG format.

In a path parallel to the above, watermark encoder 212 receives watermark information 211 from, for example, a memory unit of computer system 190 (FIG. 1). Watermark information 211 is a unique sequence of bits representing, for example, the copyright information to be embedded. Watermark encoder 212 derives bits $B_i$ from watermark information 211 using an encoding technique in accordance with the present invention. The present invention encoding technique is described in conjunction with FIGS. 3 and 7. The bits $B_i$ are used to modify a selected portion of the coefficients X (e.g., $X_i$) in order to embed an encoded version of watermark information 211 into image output 203.

Watermark modulator 210 decides which coefficients $X_i$ are to be modified based, for example, on user preferences. The coefficients selected for modification typically correspond to those locations in the image that are unobtrusive and will not be detectable by the human visual system. Various known methods for selecting the locations to be modified may be utilized in accordance with the present invention.

Watermark modulator 210 then associates each coefficient $X_i$ that is to be modified with a bit $B_i$. In accordance with the present invention, watermark modulator 210 calculates modified coefficients $X_i'$ by modifying each selected coefficient $X_i$ according to the value of the associated $B_i$. Additional information is provided in conjunction with FIGS. 3 and 7.

Continuing with reference to FIG. 2A, entropy encoding of the image data containing modified coefficients $X_i'$ is performed in a known fashion using entropy encoder 215, and digital image output 203 is stored in the JPEG format (video is stored in the MPEG format). Thus, embedded in image output 203 is the encoded version of watermark information 211. The embedded watermark can be subsequently retrieved and decoded, and the result verified to determine whether the watermark is valid. Additional information is provided in conjunction with FIGS. 5 and 8.

Figure 2B:
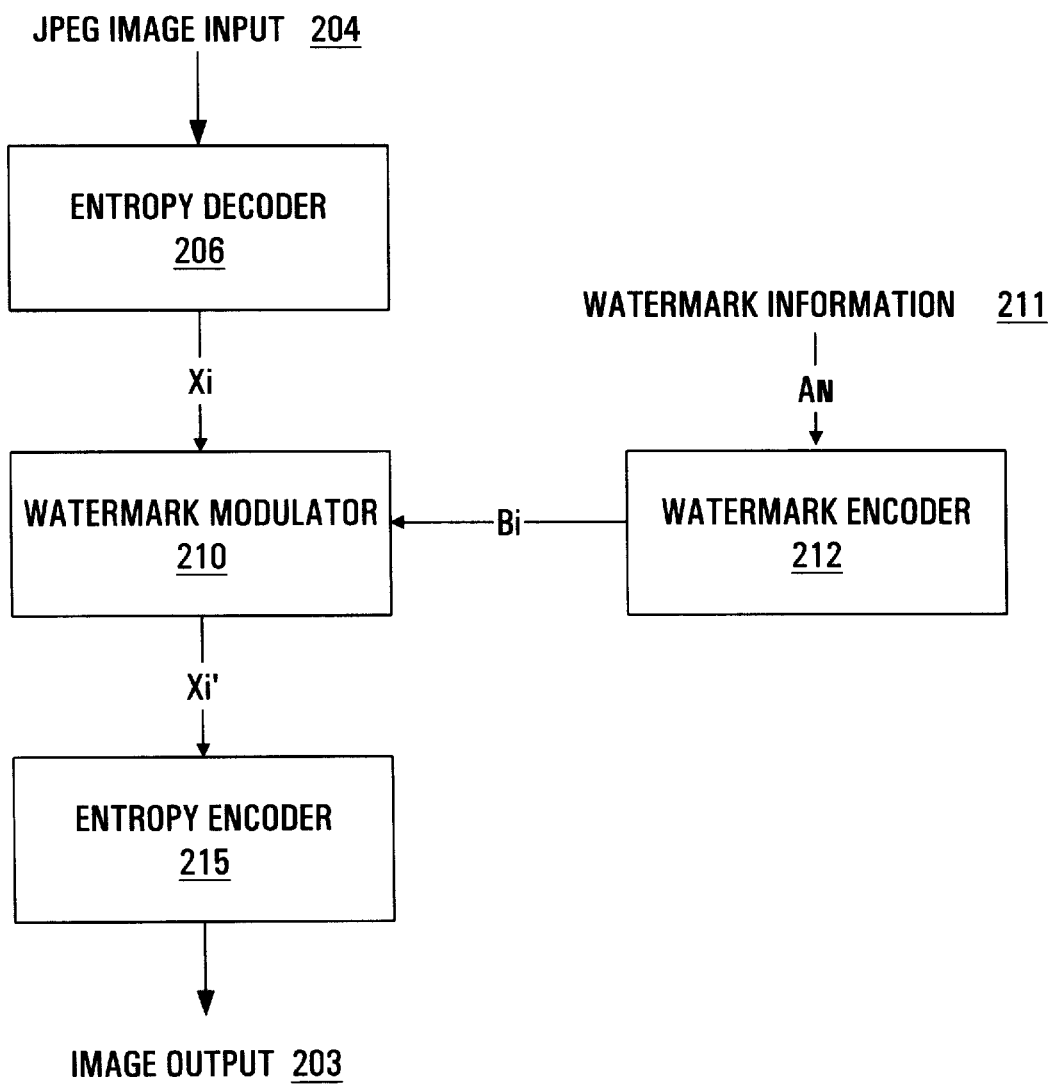
FIG. 2B is a data flow diagram of another implementation of a watermark encoder in accordance with the present invention.

With reference now to FIG. 2B, data flow diagram 201 illustrates the flow of image data (e.g., still images including text or video images) and watermark data through a watermark encoder implemented using computer system 190 (FIG. 1) in an alternate implementation of one embodiment of the present invention. In this implementation, the image data (e.g., JPEG image input 204) are already compressed using, for example, the JPEG format. It is appreciated that the present invention may be utilized with other compression formats such as MPEG.

With reference to FIG. 2B, JPEG image input 204 is entropy decoded in a known manner by entropy decoder 206. The output of JPEG decoder 206 are a plurality of DCT coefficients X that represent the digital image. From this point on in data flow diagram 201, the flow of data and the operations performed are analogous to those described for data flow diagram 200 of FIG. 2A.

Figure 3:
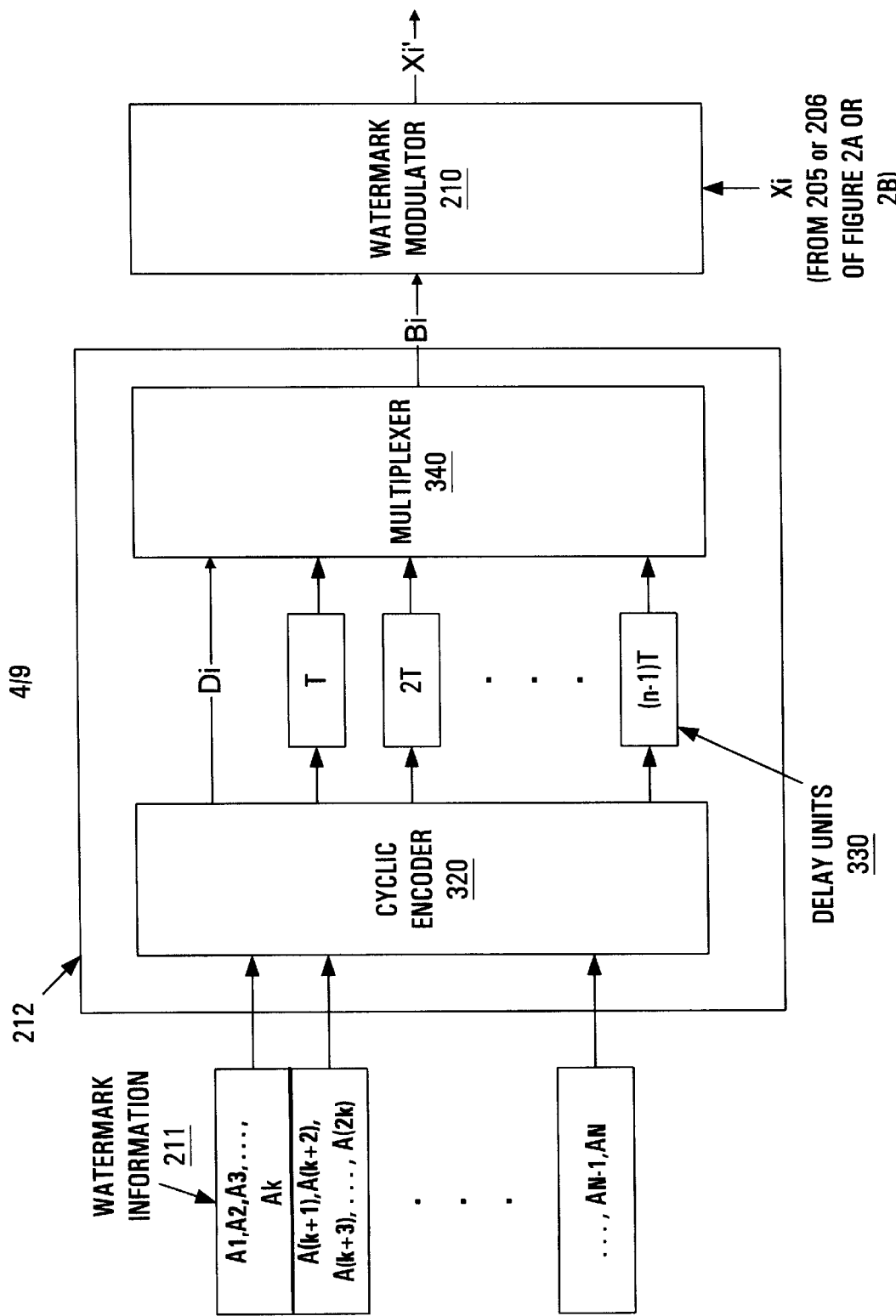
FIG. 3 is a data flow diagram providing additional details of the watermark encoder of FIGS. 2A and 2B in accordance with one embodiment of the present invention.

FIG. 3 illustrates the flow of data through watermark encoder 212 and watermark modulator 210 in accordance with one embodiment of the present invention. Watermark information 211 is a unique digital sequence of N bits (e.g., $A_1, \ldots, A_N = A_{1 \ldots N}$, where N represents the number of bits in the sequence) and the bits each have a value of either zero (0) or one (1). The present invention may be used when N is a large number, and thus watermark sequences generated in accordance with the present invention are very robust against noise. For example, in one embodiment, N is equal to 40; a sequence of 40 bits results in $2^{40}$ (over one trillion) possible combinations of bits that can be used to specify a unique watermark. As will be seen by the discussion below, even when N is large, in accordance with the present invention, the watermark is quickly and readily encoded, detected, decoded and verified.

Watermark encoder 212 and watermark modulator 210 coordinate to encode watermark information 211 and to map the encoded watermark into the image data at the locations to be modified (e.g., $X_i = X_1, \ldots, X_M$, where 'M' represents the number of locations to be modified in the image data). That is, in accordance with the present invention, watermark information 211 is encoded and mapped from N bits (e.g., $A_1 \ldots N$) to M bits (e.g., $B_i = B_1, \ldots, B_M = B_{1 \ldots M}$).

The number of locations M to be modified is by necessity at least equal to N and is preferably much greater than N (e.g., M>N). The present invention permits M to be much greater than N without causing the embedded watermark to be detectable by the human visual system, allowing the encoded watermark to be robust without reducing the capability to quickly encode and decode the watermark.

For the watermark encoding and mapping, cyclic encoder 320 separates watermark information 211 into G groups of bits, where G represents the number of groups. In the present embodiment, each group contains k bits. For example, if N is 40, watermark information 211 can be divided into ten (10) groups of four (4) bits each (e.g., G=10 and k=4).

In the present embodiment, cyclic encoder 320 utilizes an error-correcting cyclic code to map the N bits of watermark information 211 into the locations that are to be modified. In one embodiment, cyclic encoder 320 utilizes a BCH (Bose, Chaudhuri, and Hocquenghem) cyclic code.

Cyclic encoder 320 maps each group of k bits into larger groups of bits, each of these larger groups of bits containing n=M/G bits. In general, the cyclic code maps bits $A_{1 \ldots N}$, where A represents a bit (either 0 or 1) in watermark information 211, to a larger group of bits $D_{1 \ldots M}$, where D represents a bit (either 0 or 1) in the larger group. For example, if M=1400, N=40, k=4 and G=10, then n=140, and each of the 10 groups of 4 bits are mapped into a group of 140 bits each. Thus, for example:

$A_1, A_2, A_3, A_4 \rightarrow D_1, D_2, D_3, \ldots, D_{139}, D_{140};$ $A_5, A_6, A_7, A_8 \rightarrow D_{141}, D_{142}, D_{143}, \ldots, D_{279}, D_{280};$ $\vdots \qquad\qquad\qquad \vdots$ $A_{37}, A_{38}, A_{39}, A_{40} \rightarrow D_{1261}, D_{1262}, D_{1263}, \ldots, D_{1399}, D_{1400}.$ With reference still to FIG. 3, in the present embodiment, delay units 330 are used to interleave each of the groups of D bits with each other. Delay units 330 operate on each group of D bits in parallel with the other groups. That is, within each group of D bits, a time delay of zero is applied to the first bit, a time delay of T is applied to the second bit, a time delay of 2T is applied to the third bit, etc., where T represents an arbitrary unit of time such as a single processor clock cycle. Thus, for a group consisting of n bits, each bit is delayed by an amount equal to jT (j=0, ..., n−1). Hence, in the present embodiment, the first bit in each group of D bits is delayed by the same amount (e.g., zero), the second bit in each group is delayed by the same amount (e.g., T), and the $n^{th}$ bit in each group is delayed by the same amount (e.g., (n−1)T).

In the present embodiment, multiplexer 340 regroups each D bit according to the amount of the delay, so that each bit that is delayed by the same amount is placed into the same group. Thus, multiplexer 340 places all of the first bits in each group (e.g., $D_1, D_{1+n}, D_{1+2n}$, etc.) from cyclic encoder 320 into one group, all of the second bits in each group (e.g., $D_2, D_{2+n}, D_{2+2n}$, etc.) from cyclic encoder 320 into a second group, etc. Thus, for example, for G=10, M=1400 and n=140, multiplexer 340 creates 140 groups of 10 bits as follows:

$D_1, D_{141}, D_{281}, \ldots, D_{1121}, D_{1261};$ $D_2, D_{142}, D_{282}, \ldots, D_{1122}, D_{1262};$ $\vdots$ $D_{140}, D_{280}, D_{420}, \ldots, D_{1260}, D_{1400}.$ In the present embodiment, multiplexer 340 then serializes the encoded and grouped bits into a single sequence of bits. Thus, multiplexer 340 forms the encoded and grouped bits $D_j$ into a single string of bits $B_i$ (where $B_i$ is either 0 or 1). Continuing with the example above, multiplexer 340 forms the following string of bits where M=1400:

$B_i = D_1, D_{141}, D_{281}, \ldots, D_{1121}, D_{1261}, D_2, D_{142}, D_{282}, \ldots, D_{1122}, D_{1262}, \ldots, D_{140}, D_{280}, D_{420}, \ldots, D_{1260}, D_{1400}.$ The output of watermark encoder 212 is thus a single unique sequence of bits $B_i$ representing the encoded watermark. The number of bits in the encoded watermark is equal to the number of locations in the digital image data that are to be modified. In the manner described above, the present embodiment of the present invention maps the N bits of watermark information 211 into M bits, where M is greater than N. This example expands the 40 bits of watermark information into 1400 bits (e.g., N=40, M=1400).

With reference still to FIG. 3, watermark modulator 210 associates each bit of the encoded watermark with a coefficient representing a location in the image data that is to be modified. In the broadest sense, each of the bits $B_i$ is applied to 'M' of the coefficients X in the digital data; that is, watermark modulator 210 associates each $B_i$ with an $X_i$. The value of $X_i$ is modified according to the value of the associated $B_i$ to determine a modified coefficient $X_i'$.

In the present embodiment, $X_i'$ is determined by applying the following translate conditions:

$X_i' = X_i + 1$ if $B_i = 0$ and $X_i$ is an even number;

$X_i' = X_i$ if $B_i = 0$ and $X_i$ is an odd number;

$X_i' = X_i$ if $B_i = 1$ and $X_i$ is an even number; and $X_i' = X_i + 1$ if $B_i = 1$ and $X_i$ is an odd number.

Thus, in the present embodiment, if $B_i = 0$, then $X_i'$ is always an odd number, and if $B_i = 1$, then $X_i'$ is always an even number. It is appreciated that other translate conditions may be utilized in accordance with the present invention to determine $X_i'$.

The present invention only alters the digital image data by a slight amount and so the result is not detectable by the human visual system even when a large number of coefficients (representing a large number of positions in the image) are modified.

Figure 4:
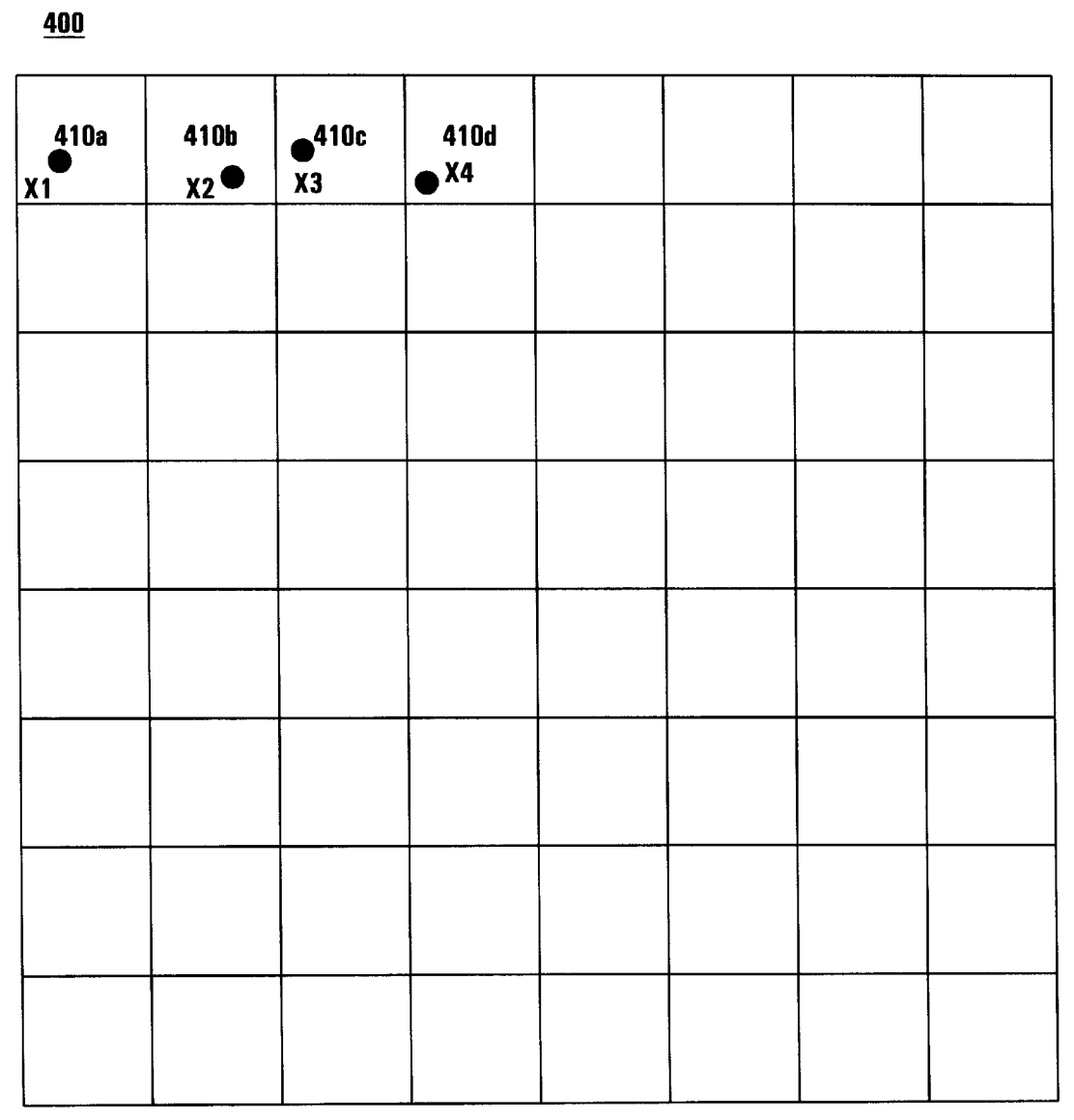

FIG. 4 represents an exemplary image frame 400 containing digital image data into which a watermark (e.g., watermark information 211) is embedded in accordance with one embodiment of the present invention. It is appreciated that image frame 400 may represent a still image, or it may represent one frame of a video image comprising multiple frames.

In the JPEG format, an image frame, for example, has dimensions of 512 pixels by 512 pixels arranged in eight by eight blocks. Thus, this exemplary JPEG image contains 64 by 64 blocks of pixels (4096 blocks). For simplicity of illustration, image frame 400 includes fewer than 4096 blocks typified by blocks 410a, 410b, 410c and 410d.

In the present embodiment, a coefficient (e.g., $X_1$, $X_2$, $X_3$ and $X_4$) within each block 410a–d is identified as a location which can be modified in order to embed the encoded watermark. The coefficients which are to be modified within each block may be located at any position within the block; it is not necessary for the same location to be modified in each block 410a–d. It is appreciated that more than one coefficient may be modified in each block. In addition, it is not necessary for a location to be modified in every block; for example, depending on the value of M (see discussion pertaining to FIG. 3), perhaps only every third block contains a location which is modified. In the present embodiment, the coefficients $X_1$, $X_2$, $X_3$ and $X_4$ are selected by watermark modulator 210 (FIG. 3) and correspond to a location in blocks 410a–d that are unobtrusive and will not be detectable by the human visual system. In accordance with the present invention, each of the coefficients $X_1$, $X_2$, $X_3$ and $X_4$ (or a subset thereof) are modified according to the value of the associated bit $B_i$ as described in conjunction with FIG. 3.

Therefore, in accordance with the present invention, the encoded and embedded watermark generated in accordance with the present invention is robust against noise, and is easy to encode, detect, retrieve and decode. In accordance with the present invention, it is not necessary to have knowledge of the original image in order to retrieve the encoded watermark, and so costly and complex equipment is not required to compare sets of data or to scan images if one set of data is not available. The encoded watermark is embedded into the digital data without significantly altering the data, thereby permitting the watermark to occupy a large number of positions in the digital data without being detectable by the human visual system and contributing to the robustness of the watermark. The present invention permits relatively large watermarks to be encoded, creating a large pool of unique watermarks so that the owner of the copyrighted information can be unambiguously identified (for example, a 40-bit watermark is readily implemented by the present invention, and with 40 bits over a trillion unique watermarks are possible).

As will be seen by the discussion below, the present invention also facilitates the watermark decoding process. In accordance with the present invention, it is only necessary to determine whether each of the $X_i'$ coefficients is even or odd, because from that information it is directly determined whether the each $B_i$ is equal to 0 or 1. Once the value of each $B_i$ is known, the watermark decoding process is performed. Hence, it is not necessary to compare the image data in hand with the original image data in order to detect or retrieve a watermark.

Figure 5:
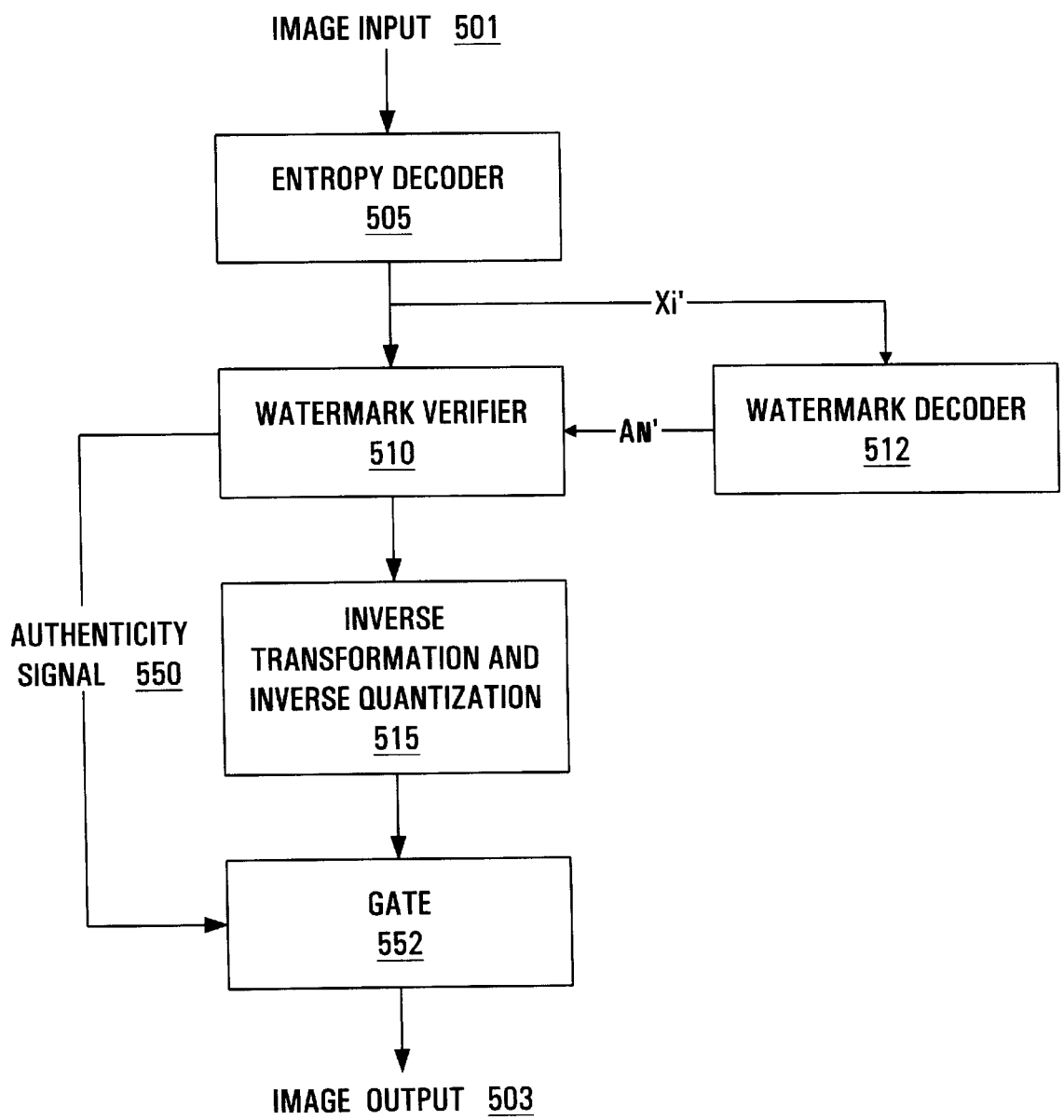
FIG. 5 is a data flow diagram of a watermark decoder in accordance with one embodiment of the present invention.

With reference now to FIG. 5, data flow diagram 500 illustrates the flow of image data through a watermark decoder implemented using computer system 190 (FIG. 1) in accordance with one embodiment of the present invention. In this embodiment, image input 501 is in the compressed domain (e.g., JPEG for still images, MPEG for video). An encoded watermark is embedded in digital image input 501 in accordance with the present invention as described in conjunction with FIG. 3; that is, at specific locations in each image frame, image input 501 contains modified coefficients $X_i'$ that are either even or odd to represent the encoded watermark.

With reference still to FIG. 5, image input 501 is entropy decoded in a known manner by entropy decoder 505. The output of entropy decoder 505 includes the modified coefficients $X_i'$. The particular locations that were modified to incorporate the encoded watermark are known; entropy decoder 505 uses the same locations as those specified by watermark modulator 210 (FIG. 3). Thus, the values (even or odd) of the modified coefficients $X_i'$ are readily determined.

Watermark decoder 512 receives the modified digital coefficients $X_i'$. The modified coefficients $X_i'$ are represented as a single sequence of bits in the same order as when they were calculated by watermark encoder 212 (FIG. 3). Thus watermark decoder 512 directly determines the value of $B_i$ in the order in which they were specified by watermark encoder 212.

Continuing with reference to FIG. 5, watermark decoder 512 decodes the encoded watermark to derive the decoded watermark. That is, the encoded watermark comprises a sequence of M bits, and watermark decoder 512 determines the sequence of N bits (where N<M) comprising the decoded watermark.

Watermark verifier 510 compares the decoded watermark to the watermark initially assigned to the image data. Watermark verifier 510 is a known threshold verifier that determines whether the watermark is sufficiently intact; in other words, it determines, for example, whether the watermark has been obscured or tampered with by the introduction of noise. Based on the evaluation of the decoded watermark, watermark verifier 510 determines whether the image data can be used. For example, if the decoded watermark is satisfactory, the image data can be viewed, recorded or copied. Otherwise, when incorrect copyright information is decoded, watermark verifier 510 prevents these operations from occurring in order to prevent copyright violations. In one embodiment, watermark verifier 510 transmits authenticity signal 550 to gate 552, thereby permitting the image data to be used.

Inverse transformation and inverse quantization element 515 performs inverse transformation and quantization functions, such as those of a JPEG decoder.

Figure 6:
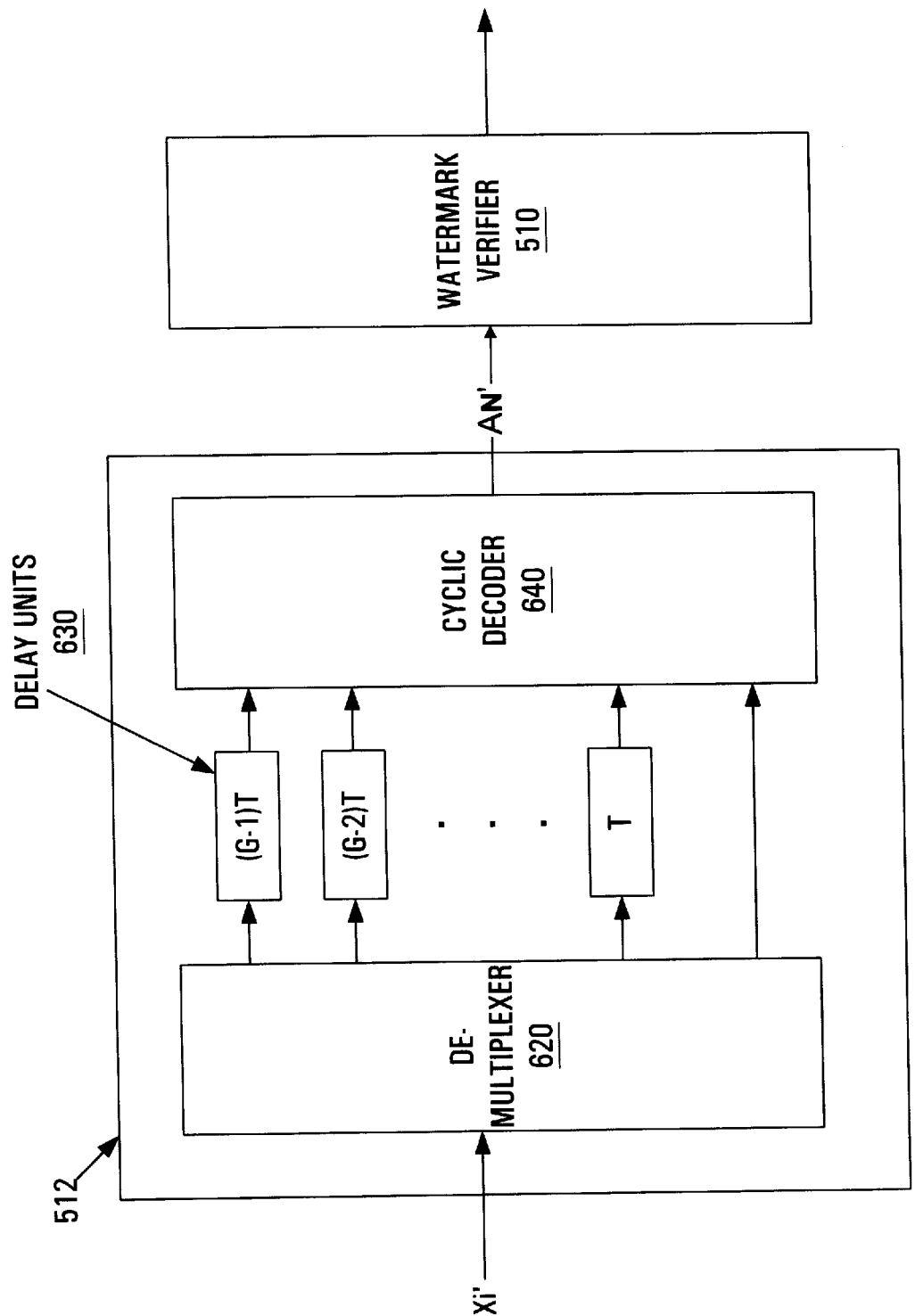
FIG. 6 is a data flow diagram providing additional details of the watermark decoder of FIG. 5 in accordance with one embodiment of the present invention.

FIG. 6 illustrates the flow of data through watermark decoder 512 and watermark verifier 510 in accordance with one embodiment of the present invention. In essence, watermark decoder 512 reverses the operations performed by watermark encoder 212 of FIG. 3.

With reference to FIG. 6, watermark decoder 512 reads the sequence of modified coefficients $X_i'$ and determines the value (zero or one) of each bit in the sequence of bits $B_i'$ based on whether the modified coefficients $X_i'$ are even or odd by applying the reverse of the translate conditions described above (the designation $B_i'$ indicates that these bits may be different from the bits $B_1$ of FIG. 3 due to, for example, the introduction of noise).

Continuing with reference to FIG. 6, in the present embodiment, demuliplexer 620 deserializes the bits $B_i'$ into separate groups each containing the same number of bits. For example, for M=1400, N=40, k=4, G=10, and n=140 (where these parameters are as defined above with regard to FIG. 3), demultiplexer 620 forms 140 groups of 10 bits each. Thus, for example, demultiplexer 620 results in the following groups of 10 bits, where D' is 0 or 1:

$$B'_i \rightarrow D'_1, D'_{141}, \ldots, D'_{1121}, D'_{1261};$$

$$D'_2, D'_{142}, \ldots, D'_{1122}, D'_{1262};$$

$$\vdots$$

$$D'_{140}, D'_{280}, \ldots, D'_{1260}, D'_{1400}.$$

In the present embodiment, delay units 630 are used to interleave each of the groups of D' bits with each other. That is, within each group of D' bits, a time delay of (G-1)T is applied to the first bit, a time delay of (G-2)T is applied to the second bit, etc., where T represents an arbitrary unit of time such as a single processor clock cycle. In this embodiment, the next to the last bit is thus delayed by an amount T and the last bit has a delay time of zero. Hence, in the present embodiment, the first bit in each group is delayed by the same amount, the second bit in each group is delayed by the same amount, etc.

For example, for G=10, M=1400 and n=140, delay units 630 form 10 groups of 140 bits each as follows:

$$D'_1, D'_2, D'_3, \ldots, D'_{139}, D'_{140};$$

$$D'_{141}, D'_{142}, D'_{143}, \ldots, D'_{279}, D'_{280};$$

$$\vdots$$

$$D'_{1261}, D'_{1262}, D'_{1263}, \ldots, D'_{1399}, D'_{1400}.$$

Cyclic decoder 640 essentially performs an inverse of the operation performed by cyclic encoder 320 of FIG. 3. In the present embodiment, cyclic decoder utilizes a BCH cyclic code to map the n bits in each group received from delay units 630 into an equal number of groups of k bits each, where k is less than n. In general, cyclic decoder 640 maps bits $D'_{1 \ldots M}$ to $A'_{1 \ldots N}$ by mapping each group of n bits to a group of k bits, then serializing the results.

For example, for M=1400, N=40, n=140 and k=4, cyclic decoder 640 results in the following:

$$D'_1, D'_2, D'_3, \ldots, D'_{139}, D'_{140} \rightarrow A'_1, A'_2, A'_3, A'_4;$$

$$D'_{141}, D'_{142}, D'_{143}, \ldots, D'_{279}, D'_{280} \rightarrow A'_5, A'_6, A'_7, A'_8;$$

$$\vdots \qquad \qquad \vdots$$

$$D'_{1261}, D'_{1262}, D'_{1263}, \ldots, D'_{1399}, D'_{1400} \rightarrow A'_{37}, A'_{38}, A'_{39}, A'_{40};$$

and $$\rightarrow A'_1, A'_2, A'_3, A'_4, A'_5, A'_6, A'_7, A'_8, \ldots, A'_{37}, A'_{38}, A'_{39}, A'_{40}.$$

Thus, using the modified coefficients $X_1'$, the present embodiment of the present invention derives the decoded watermark represented by $A'_{1 \ldots N}$ as output from cyclic decoder 640. Watermark verifier 510 then compares the decoded watermark $A'_{1 \ldots N}$ against the valid watermark to ensure copyright protection.

Figure 7:
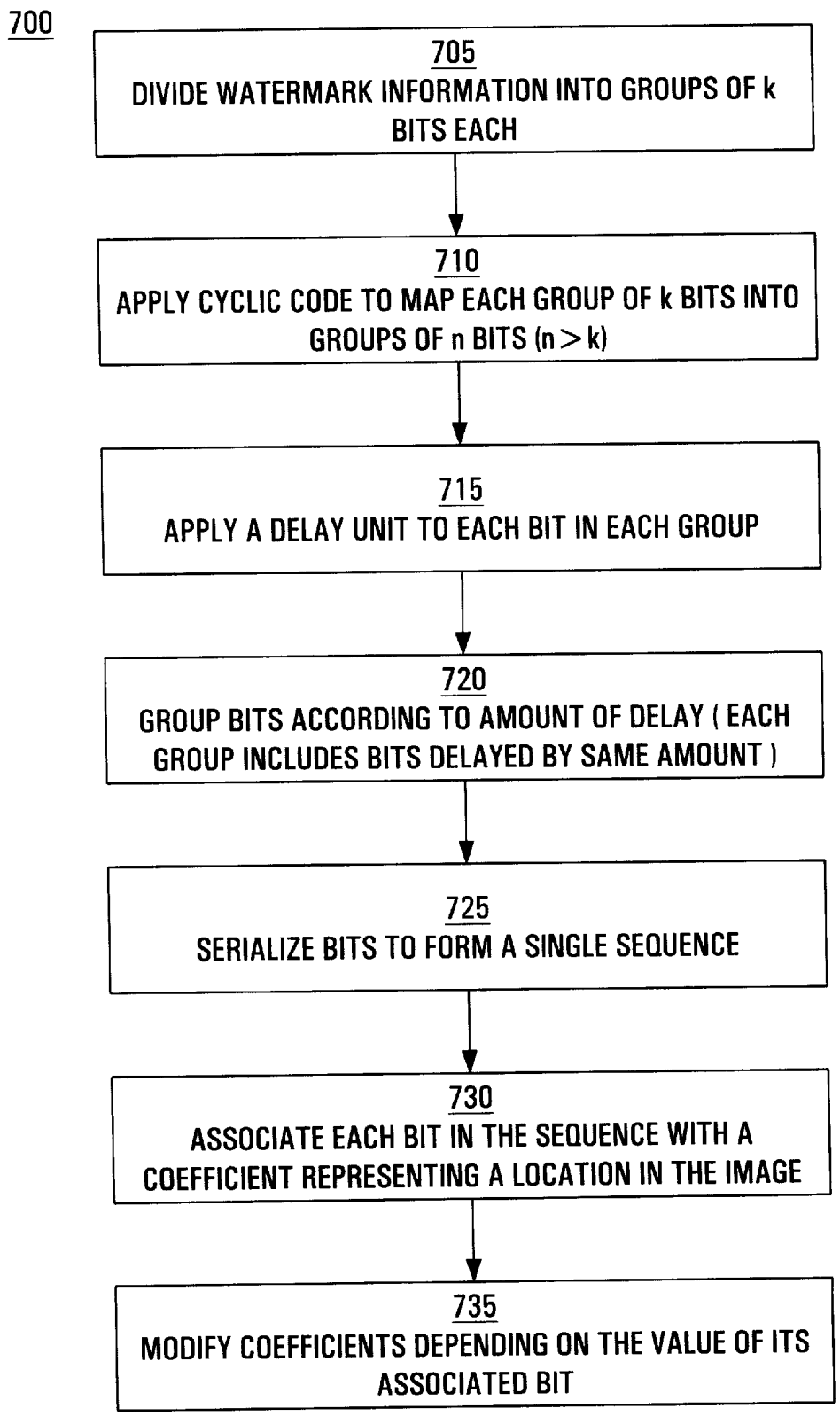
FIG. 7 is a flowchart of the process for encoding information within digital data in accordance with one embodiment of the present invention.

FIG. 7 is a flowchart of process 700 used to encode watermark information such as copyright information into image data in accordance with one embodiment of the present invention. Process 700 is implemented using computer-readable program instructions executed by processor 101 of computer system 190 of FIG. 1.

In step 705 of FIG. 7, the watermark information $A_{1 \ldots N}$ (e.g., watermark information 211 of FIG. 3) that is to be encoded into the digital image (e.g., frame 400 of FIG. 4) is divided into a number of groups, each group containing the same number of bits k. Each of the bits has a value of either 0 or 1. The number of groups equals N/k.

In step 710 of FIG. 7, a cyclic code is applied to each group of k bits in order to map each group into a larger group of n bits, where n is greater than k. In the present embodiment, a BCH cyclic code is utilized.

In step 715, a delay unit is applied to each of the n bits in each group formed in step 710. The length of the delay unit is different for each bit in each group. In the present embodiment, the first bit in each group has a zero delay, the second bit in each group is delayed by an amount T, the third bit in each group is delayed by an amount 2T, etc., where T represents a unit of time such as a processor clock cycle. Thus, in accordance with the present embodiment of the present invention, each first bit in each group is delayed by the same amount, each second bit in each group is delayed by the same amount, etc.

In step 720, the bits are grouped according to the amount of the delay applied to them in step 715. Thus, each group formed in step 720 contains bits that are delayed by the same amount. Accordingly, the first group formed in step 720 contains only the first bits from each of the groups from step 710, the second group formed in step 720 contains only the second bits from each of the groups from step 710, etc.

In step 725, the bits in the groups from step 720 are serialized to form a single sequence comprising all of the bits. That is, in the present embodiment, the second group of bits from step 720 are strung behind the first group of bits from step 720, the third group of bits from step 720 are strung behind the second group of bits from step 720, etc. Thus, at this point in process 700, watermark information 211 has been encoded and is represented by a single sequence of M bits, $B_i$. Each $B_i$ is equal to either 0 or 1.

In step 730, each bit in the sequence formed in step 725 is associated with a coefficient $X_i$ representing a particular location in frame 400. In accordance with the present invention, each of the coefficients $X_i$ is to be modified in order to incorporate the encoded watermark information. The particular locations to be modified are selected using any of a variety of known methods, and are chosen so that they are not detectable by the human visual system. The number of locations to be modified is equal to the number of bits in the encoded watermark. Thus, bit i in the encoded water mark is associated with coefficient i in the digital image.

In step 735, each coefficient to be modified is modified as a function of the value of the associated bit from the encoded watermark. In the present embodiment, each coefficient $X_i$ is modified depending on its value and depending on the value of the associated bit $B_i$. In the present embodiment, the following conditions are used to modify the coefficients although it is appreciated that other conditions may be applied in accordance with the present invention:

$X_i' = X_i + 1$ if $B_i = 0$ and $X_i$ is an even number;
$X_i' = X_i$ if $B_i = 0$ and $X_i$ is an odd number;
$X_i' = X_i$ if $B_i = 1$ and $X_i$ is an even number; and
$X_i' = X_i + 1$ if $B_i = 1$ and $X_i$ is an odd number.

Thus, in the present embodiment, if $B_i = 0$, then $X_i'$ is always an odd number, and if $B_i = 1$, then $X_i'$ is always an even number. The present invention only alters the digital image data by a slight amount and so the result is not detectable by the human visual system even when a large number of coefficients (representing a large number of positions in the image) are modified.

Figure 8:
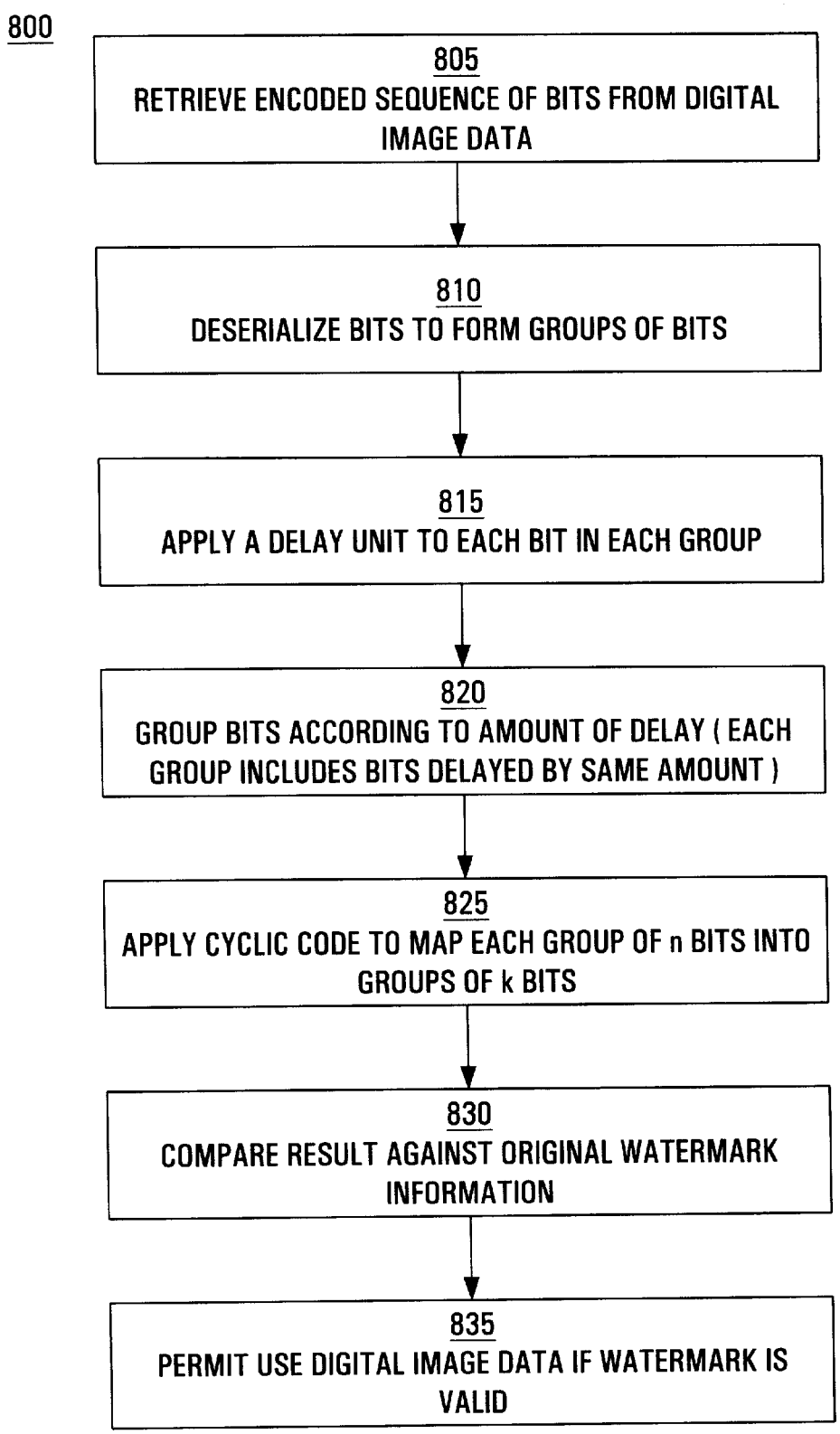
FIG. 8 is a flowchart of the process for decoding information retrieved from digital data in accordance with one embodiment of the present invention.

FIG. 8 is a flowchart of process 800 used to decode watermark information such as copyright information from image data in accordance with one embodiment of the present invention. Process 800 is implemented using computer-readable program instructions executed by processor 101 of computer system 190 of FIG. 1.

In step 805, the encoded watermark is retrieved from the digital image (e.g., image input 501 of FIG. 5). As described in conjunction with FIG. 7, coefficients $X_i$ representing particular locations in image input 501 were modified to embed the encoded watermark information. In accordance with the present invention, the coefficients $X_i$ were modified as a function of the value of an associated bit $B_i$ of the encoded watermark. In the present embodiment, the coefficients were modified in a manner such that a modified coefficient $X_i'$ is an odd number if the associated bit was one value, and an even number if the associated bit was another value.

With reference to FIG. 8, the modified locations are known and therefore the value (even or odd) of each modified coefficient $X_i'$ is readily determined. Accordingly, the value of the encoded watermark bit associated with each modified coefficient is also readily determined based on whether the modified coefficient is odd or even. For example, in the present embodiment, if the modified coefficient is odd, then the associated encoded watermark bit is 0, and if the modified coefficient is even, the associated encoded watermark bit is 1. Thus, in step 805, the sequence of bits representing the encoded watermark are retrieved from image input 501. In accordance with the present invention, it is not necessary to have knowledge of the original image in order to retrieve the encoded watermark.

In step 810 of FIG. 8, the sequence of bits from step 805 are deserialized to form smaller groups of bits. In essence, step 810 is the inverse of step 720 of FIG. 7. Thus, in the present embodiment, the number of groups formed in step 810 is the same as the number of groups formed in step 720.

In step 815 of FIG. 8, a delay unit is applied to each of the bits in each of the groups formed in step 810. The length of the delay unit is different for each bit in each group. In the present embodiment, the first bit in each group has a delay of a certain amount, the second bit in each group is delayed by an incremental amount less than the first bit, the third bit in each group is delayed by an incremental amount less than the second bit, etc. Thus, in accordance with the present embodiment of the present invention, each first bit in each group is delayed by the same amount, each second bit in each group is delayed by the same amount, etc.

In step 820, the bits are grouped according to the amount of the delay applied to them in step 815. Thus, each group formed in step 820 contains n bits that are delayed by the same amount. Accordingly, the first group formed in step 820 contains only the first bits from each of the groups from step 810, the second group formed in step 820 contains only the second bits from each of the groups from step 810, etc.

In step 825, a cyclic code is applied to each group of n bits from step 820 in order to map these groups into smaller groups of k bits, where k is less than n. In the present embodiment, a BCH cyclic code is utilized. In essence, step 825 is the inverse of step 710 of FIG. 7. The smaller groups of k bits are then serialized to form a single string of bits that represents the decoded watermark.

In step 830 of FIG. 8, the decoded watermark is compared against the valid watermark using a threshold verifier (e.g., watermark verifier 510 of FIG. 6).

In step 835 of FIG. 8, if the decoded watermark provides a satisfactory match against the valid watermark representing, for example, copyright information, then subsequent operations such as viewing or recording may be performed using the digital image data. If the match is not satisfactory, it is assumed that a valid watermark is absent, and subsequent operations are not permitted.

Thus, the present invention provides a method and system thereof for encoding and embedding watermark information into digital data representing, for example, still images (including text) and video images. The present invention may be applied in the compressed or uncompressed digital data domain including JPEG and MPEG, and can be extended to future formats including, for example, JPEG 2000 compressed images and MP3 or AC3 compressed digital audio.

The encoded and embedded watermark generated in accordance with the present invention is robust against noise, and is easy to encode, detect, retrieve and decode. In accordance with the present invention, it is not necessary to have knowledge of the original image in order to retrieve the encoded watermark, and so costly and complex equipment is not required to compare sets of data or to scan images if one set of data is not available. The encoded watermark is embedded into the digital data without significantly altering the data, thereby permitting the watermark to occupy a large number of positions in the digital data without being detectable by the human visual system and contributing to the robustness of the watermark. The present invention permits relatively large watermarks to be encoded, creating a large pool of unique watermarks so that the owner of the copyrighted information can be unambiguously identified (for example, a 40-bit watermark is readily implemented by the present invention, and with 40 bits over a trillion unique watermarks are possible).

The preferred embodiment of the present invention, high redundancy system and method for watermarking digital image and video data, is thus described. While the present invention has been described in particular embodiments, it should be appreciated that the present invention should not be construed as limited by such embodiments, but rather construed according to the below claims.

What is claimed is:

1. A method for encoding information within digital data, said method comprising the steps of:

a) mapping a sequence of bits of a code into a first plurality of groups, wherein said first plurality of groups comprise more bits than said sequence of bits;

b) interleaving bits from each group of said first plurality of groups to form a second plurality of groups;

c) serializing bits from said second plurality of groups to form an encoded sequence of bits; and d) encoding said code into said digital data by modifying coefficients of said digital data according to said encoded sequence of bits, wherein each bit of said encoded sequence of bits is used to modify a respective coefficient.

2. The method for encoding information within digital data as recited in claim 1 wherein said digital data are image data.

3. The method for encoding information within digital data as recited in claim 2 wherein said image data are in a compressed format.

4. The method for encoding information within digital data as recited in claim 1 wherein said step a) further comprises the steps of:

a1) separating said sequence of bits into a plurality of subgroups of bits; and a2) mapping each subgroup into one of said first plurality of groups.

5. The method for encoding information within digital data as recited in claim 4 wherein said step a) uses an error-correcting cyclic code to perform said mapping.

6. The method for encoding information within digital data as recited in claim 5 wherein said error-correcting cyclic code is a BCH (Bose, Chaudhuri, and Hocquenghem) code.

7. The method for encoding information within digital data as recited in claim 1 wherein said step b) comprises the steps of:
   b1) delaying each bit in each group of said first plurality of groups by a certain amount; and
   b2) grouping bits so that each group in said second plurality of groups comprises bits delayed by a same amount.

8. The method for encoding information within digital data as recited in claim 1 wherein said step d) comprises the steps of:
   d1) associating a bit in said encoded sequence with a coefficient of said digital data; and
   d2) modifying said coefficient based on a value of said bit.

9. The method for encoding information within digital data as recited in claim 8 wherein said step d2) comprises the steps of:
   making said coefficient even when said bit has a first value; and
   making said coefficient odd when said bit has a second value.

10. The method for encoding information within digital data as recited in claim 1 further comprising the steps of:
    e) reading said coefficients of said digital data to retrieve said encoded sequence; and
    f) decoding said encoded sequence.

11. The method for encoding information within digital data as recited in claim 10 wherein said step f) further comprises the steps of:
    f1) deserializing said encoded sequence to form a plurality of groups of interleaved bits;
    f2) applying a delay unit to each bit in each group of said plurality of groups of interleaved bits to form a third plurality of groups of bits, wherein each group in said third plurality of groups comprises bits delayed by a same amount; and
    f3) mapping said third plurality of groups into a decoded sequence of bits, wherein said decoded sequence of bits contains fewer bits than said third plurality of groups.

12. A computer system comprising:
    a bus;
    a processor coupled to said bus; and
    a computer-readable memory unit coupled to said bus;
    said processor for performing a method for encoding information within digital data, said method comprising the steps of:
    a) mapping a sequence of bits of a code into a first plurality of groups, wherein said first plurality of groups comprise more bits than said sequence of bits;
    b) interleaving bits from each group of said first plurality of groups to form a second plurality of groups;
    c) serializing bits from said second plurality of groups to form an encoded sequence of bits; and
    d) encoding said code into said digital data by modifying coefficients of said digital data according to said encoded sequence of bits, wherein each bit of said encoded sequence of bits is used to modify a respective coefficient.

13. The computer system of claim 12 wherein said processor performs said method for encoding information within digital data wherein said step a) further comprises the step of:
    a1) separating said sequence of bits into a plurality of subgroups of bits; and
    a2) mapping each subgroup into one of said first plurality of groups.

14. The computer system of claim 13 wherein said processor performs said method for encoding information within digital data wherein said step a) uses a BCH (Bose, Chaudhuri, and Hocquenghem) error-correcting cyclic code to perform said mapping.

15. The computer system of claim 12 wherein said processor performs said method for encoding information within digital data wherein said step b) comprises the steps of:
    b1) delaying each bit in each group of said first plurality of groups by a certain amount; and
    b2) grouping bits so that each group in said second plurality of groups comprises bits delayed by a same amount.

16. The computer system of claim 12 wherein said processor performs said method for encoding information within digital data wherein said step d) comprises the steps of:
    d1) associating a bit in said encoded sequence with a coefficient of said digital data;
    d2) making said coefficient even when said bit has a first value; and
    d3) making said coefficient odd when said bit has a second value.

17. The computer system of claim 12 wherein said processor performs said method for encoding information within digital data wherein said method further comprises the steps of:
    e) reading said coefficients of said digital data to retrieve said encoded sequence; and
    f) decoding said encoded sequence.

18. The computer system of claim 17 wherein said processor performs said method for encoding information within digital data wherein said step f) further comprises the steps of:
    f1) deserializing said encoded sequence to form a plurality of groups of interleaved bits;
    f2) applying a delay unit to each bit in each group of said plurality of groups of interleaved bits to form a third plurality of groups of bits, wherein each group in said third plurality of groups comprises bits delayed by a same amount; and
    f3) mapping said third plurality of groups into a decoded sequence of bits, wherein said decoded sequence of bits contains fewer bits than said third plurality of groups.

19. A system for encoding information within digital data, said system comprising:
    encoding means for mapping a sequence of bits of a code into a first plurality of groups, wherein said first plurality of groups comprises more bits than said sequence of bits;
    said encoding means also for forming an encoded sequence of bits by interleaving bits from each group of said first plurality of groups to form a second plurality of groups and by serializing bits from said second plurality of groups; and modulating means for encoding said code into said digital data by modifying coefficients of said digital data according to said encoded sequence of bits.

20. A system for encoding information within digital data as described in claim 19 wherein said encoding means uses a BCH (Bose, Chaudhuri, and Hocquenghem) error-correcting cyclic code for said mapping.

21. A system for encoding information within digital data as described in claim 19 wherein said encoding means delays each bit in each group of said first plurality of groups by a certain amount and groups bits so that each group in said second plurality of groups comprises bits delayed by a same amount.

22. A system for encoding information within digital data as described in claim 19 wherein said modulator means associates a bit in said encoded sequence with a coefficient of said digital data and makes said coefficient even when said bit has a first value and said coefficient odd when said bit has a second value.

23. A system for encoding information within digital data as described in claim 19 further comprising:

decoder means for decoding said encoded sequence of bits, wherein said decoder means deserializes said encoded sequence to form a plurality of groups of interleaved bits and applies a delay unit to each bit in each group of said plurality of groups of interleaved bits to form a third plurality of groups of bits; and wherein said decoder means also maps said third plurality of groups into a decoded sequence of bits, wherein said decoded sequence of bits contains fewer bits than said third plurality of groups.

24. A method for decoding information within digital data, said method comprising the steps of:

a) reading coefficients of said digital data to retrieve an encoded sequence of bits, wherein a bit of said encoded sequence of bits has a first value when said coefficient is even and a second value when said coefficient is odd; and b) decoding said encoded sequence of bits by:

b1) deserializing said encoded sequence to form a plurality of groups of interleaved bits;

b2) applying a delay unit to each bit in each group of said plurality of groups of interleaved bits to form a third plurality of groups of bits, wherein each group in said third plurality of groups comprises bits delayed by a same amount; and b3) mapping said third plurality of groups into a decoded sequence of bits, wherein said decoded sequence of bits contains fewer bits than said third plurality of groups.

25. The method for decoding information within digital data as recited in claim 24 further comprising the steps of:

c) comparing a decoded sequence of bits to a valid sequence of bits; and d) blocking use of said digital data when said decoded sequence of bits does not satisfactorily match said valid sequence of bits.

* * * * *